United States Patent
Siew et al.

(10) Patent No.: US 9,481,777 B2
(45) Date of Patent: Nov. 1, 2016

(54) METHOD OF DEWATERING IN A CONTINUOUS HIGH INTERNAL PHASE EMULSION FOAM FORMING PROCESS

(71) Applicant: The Procter & Gamble Company, Cincinnati, OH (US)

(72) Inventors: Wei-ling Siew, Belleville (CA); Jiajie Zhang, Belleville (CA); Aditya Garg, Belleville (CA)

(73) Assignee: The Procter & Gamble Company, Cincinnati, OH (US)

( * ) Notice: Subject to any disclaimer, the term of this patent is extended or adjusted under 35 U.S.C. 154(b) by 466 days.

(21) Appl. No.: 13/849,873

(22) Filed: Mar. 25, 2013

(65) Prior Publication Data

US 2013/0256935 A1   Oct. 3, 2013

Related U.S. Application Data

(60) Provisional application No. 61/618,342, filed on Mar. 30, 2012.

(51) Int. Cl.
*B29C 67/00* (2006.01)
*C08J 9/228* (2006.01)
*B29C 67/20* (2006.01)

(52) U.S. Cl.
CPC .............. *C08J 9/228* (2013.01); *B29C 67/202* (2013.01); *C08J 2201/028* (2013.01)

(58) Field of Classification Search
CPC ...... C08J 9/228; C08J 2201/028; C08J 9/28; C08J 9/283; B29C 44/20; B29C 67/202; B29C 67/20
USPC ............................................................ 264/53
See application file for complete search history.

(56) References Cited

U.S. PATENT DOCUMENTS

| | | | |
|---|---|---|---|
| 2,191,857 A | | 2/1940 | Miller |
| 2,881,675 A | * | 4/1959 | Reginald ................ 162/203 |
| 2,893,136 A | | 7/1959 | Daane et al. |
| 2,951,007 A | | 8/1960 | Lippke |
| 3,040,807 A | | 6/1962 | Chope |
| 3,089,252 A | | 5/1963 | Daane et al. |
| 3,161,482 A | | 12/1964 | Gschwind et al. |
| 3,163,503 A | | 12/1964 | Conture et al. |
| 3,167,408 A | | 1/1965 | Justus et al. |
| 3,176,411 A | | 4/1965 | Jepson et al. |
| 3,203,850 A | | 8/1965 | McCarty |
| 3,214,845 A | | 11/1965 | Huliman |
| 3,244,206 A | | 4/1966 | Bossen |
| 3,260,642 A | | 7/1966 | Canter |
| 3,284,920 A | | 11/1966 | Jokihaara |
| 3,320,677 A | | 5/1967 | Reitzel |
| 3,337,968 A | | 8/1967 | Krikorian |
| 3,358,378 A | | 12/1967 | Downs |

(Continued)

OTHER PUBLICATIONS

PCT International Search Report dated Jul. 2, 2013, 12 pages.

*Primary Examiner* — Christina Johnson
*Assistant Examiner* — Xue Liu
(74) *Attorney, Agent, or Firm* — Andres E. Velarde (57) ABSTRACT

A method for continuous High Internal Phase Emulsion (HIPE) foam production. A HIPE is produced then extruded onto a belt. After polymerization, a portion of the saturated aqueous phase is removed using a vacuum box. A nip insert is inserted under the vacuum box to raise the vacuum box leading to improved uniformity of the HIPE in the cross direction along the belt.

14 Claims, 2 Drawing Sheets

(56) References Cited

U.S. PATENT DOCUMENTS

| | | |
|---|---|---|
| 3,388,479 A | 6/1968 | Gardner |
| 3,399,460 A | 9/1968 | Russell |
| 3,406,464 A | 10/1968 | Clark |
| 3,409,220 A | 11/1968 | Black |
| 3,411,075 A | 11/1968 | Kahoun |
| 3,432,656 A | 3/1969 | Smith |
| 3,432,936 A | 3/1969 | Cole |
| 3,497,802 A | 2/1970 | Biddle |
| 3,519,024 A | 7/1970 | Johnson et al. |
| 3,533,909 A | 10/1970 | Bennett |
| 3,534,381 A | 10/1970 | McKeegan |
| 3,536,258 A | 10/1970 | Rocheleau |
| 3,547,775 A | 12/1970 | Bossen |
| 3,555,700 A | 1/1971 | Wagner |
| 3,559,298 A | 2/1971 | Theilemann |
| 3,564,724 A | 2/1971 | Keyes et al. |
| 3,590,991 A | 7/1971 | Sloan |
| 3,619,359 A | 11/1971 | Keyes |
| 3,622,448 A | 11/1971 | Adams et al. |
| 3,625,812 A | 12/1971 | Gudaz et al. |
| 3,658,642 A | 4/1972 | Keyes et al. |
| 3,662,170 A | 5/1972 | Keyes |
| 3,666,621 A | 5/1972 | Adams |
| 3,668,401 A | 6/1972 | Shah et al. |
| 3,668,787 A | 6/1972 | Berg et al. |
| 3,713,966 A | 1/1973 | Lippke |
| 3,726,757 A | 4/1973 | Dupasquier |
| 3,731,520 A | 5/1973 | Hickman et al. |
| 3,751,373 A | 8/1973 | Graffeo et al. |
| 3,762,211 A | 10/1973 | Poulsen |
| 3,774,225 A | 11/1973 | Kimmel et al. |
| 3,776,471 A | 12/1973 | Meyer et al. |
| 3,778,908 A | 12/1973 | Notbohm |
| 3,782,192 A | 1/1974 | Sandblom |
| 3,791,049 A | 2/1974 | Smith |
| 3,793,741 A | 2/1974 | Smith |
| 3,805,401 A | 4/1974 | Fontein |
| 3,829,764 A | 8/1974 | Bosisio |
| 3,837,088 A | 9/1974 | Lenz |
| 3,847,730 A | 11/1974 | Doering |
| 3,849,904 A | 11/1974 | Villalobos |
| 3,857,023 A | 12/1974 | McCall |
| 3,867,766 A | 2/1975 | Wagner |
| 3,872,603 A | 3/1975 | Schuette et al. |
| 3,872,919 A | 3/1975 | Maag |
| 3,878,620 A | 4/1975 | Gallahue |
| 3,879,607 A | 4/1975 | Bjorklund |
| 3,897,638 A | 8/1975 | Lenz |
| 3,925,906 A | 12/1975 | Chance et al. |
| 3,962,799 A | 6/1976 | Lapointe et al. |
| 3,967,197 A | 6/1976 | Anderson |
| 3,989,085 A | 11/1976 | Crosby |
| 4,077,766 A | 3/1978 | von der Eltz |
| 4,082,504 A | 4/1978 | von der Eltz |
| 4,086,691 A | 5/1978 | Smith |
| 4,091,824 A | 5/1978 | Psaras |
| 4,096,643 A | 6/1978 | Futcher |
| 4,109,432 A | 8/1978 | Pilz |
| 4,124,942 A | 11/1978 | Ohls et al. |
| 4,125,945 A | 11/1978 | Westelaken |
| 4,134,731 A | 1/1979 | Houser |
| 4,146,972 A | 4/1979 | Smith |
| 4,152,202 A | 5/1979 | DeLigt |
| 4,156,843 A | 5/1979 | Strandberg |
| 4,174,863 A | 11/1979 | Gotz |
| 4,188,731 A | 2/1980 | Rauskolb |
| 4,192,080 A | 3/1980 | Irpola |
| 4,193,027 A | 3/1980 | Wyslouzil |
| 4,194,298 A | 3/1980 | Hart |
| 4,204,337 A | 5/1980 | Roos |
| 4,205,632 A | 6/1980 | Tratz |
| 4,207,143 A | 6/1980 | Glomb |
| 4,247,990 A | 2/1981 | Ohls |
| 4,249,992 A | 2/1981 | Wells |
| 4,252,443 A | 2/1981 | Lucas |
| 4,253,247 A | 3/1981 | Bergstrom |
| 4,259,431 A | 3/1981 | Opitz |
| 4,266,878 A | 5/1981 | Auer |
| 4,267,046 A | 5/1981 | Stoev |
| 4,312,139 A | 1/1982 | Bilek et al. |
| 4,314,878 A | 2/1982 | Lee |
| 4,319,185 A | 3/1982 | Hill |
| 4,320,583 A | 3/1982 | Dove |
| 4,331,510 A | 5/1982 | Wells |
| 4,350,757 A | 9/1982 | Montag |
| 4,351,700 A | 9/1982 | Dove |
| 4,377,985 A | 3/1983 | Reba |
| 4,378,207 A | 3/1983 | Smith |
| 4,384,514 A | 5/1983 | Larive |
| 4,399,403 A | 8/1983 | Strandberg |
| 4,404,951 A | 9/1983 | Zechlin |
| 4,419,889 A | 12/1983 | Muto |
| 4,422,575 A | 12/1983 | Dove |
| 4,445,788 A | 5/1984 | Twersky |
| 4,474,643 A | 10/1984 | Lindblad |
| 4,492,044 A | 1/1985 | Knutsen |
| 4,494,316 A | 1/1985 | Richie |
| 4,494,319 A | 1/1985 | Rudt |
| 4,498,864 A | 2/1985 | Roth |
| 4,500,607 A | 2/1985 | Louden |
| 4,514,913 A | 5/1985 | Stephansen |
| 4,517,055 A | 5/1985 | Dove |
| 4,526,654 A | 7/1985 | Johansson |
| 4,536,970 A | 8/1985 | Eskelinen |
| 4,539,073 A | 9/1985 | Andersson |
| 4,543,737 A | 10/1985 | Boissevain |
| 4,545,857 A | 10/1985 | Wells |
| 4,552,570 A | 11/1985 | Gravatt |
| 4,569,069 A | 2/1986 | LaMarche |
| 4,573,402 A | 3/1986 | Sharma |
| 4,580,355 A | 4/1986 | Boissevain |
| 4,583,302 A | 4/1986 | Smith |
| 4,586,983 A | 5/1986 | Laapotti et al. |
| 4,590,685 A | 5/1986 | Roth |
| 4,604,054 A | 8/1986 | Smith |
| 4,610,530 A | 9/1986 | Lehmbeck |
| 4,627,176 A | 12/1986 | Brieu |
| 4,628,655 A | 12/1986 | Scheiderer |
| 4,630,535 A | 12/1986 | Haygreen |
| 4,639,291 A | 1/1987 | Ota |
| 4,639,292 A | 1/1987 | Ota |
| 4,649,964 A | 3/1987 | Smith |
| 4,656,333 A | 4/1987 | Murphy |
| 4,662,398 A | 5/1987 | Wywailowski |
| 4,689,895 A | 9/1987 | Taylor |
| 4,694,587 A | 9/1987 | Eskelinen |
| 4,719,728 A | 1/1988 | Eriksson |
| 4,722,681 A | 2/1988 | Smith |
| 4,733,078 A | 3/1988 | Sturm |
| 4,757,585 A | 7/1988 | Niskanen et al. |
| 4,763,424 A | 8/1988 | Taylor |
| 4,767,981 A | 8/1988 | Pakulis |
| 4,791,863 A | 12/1988 | Vähe,ätalo |
| 4,793,250 A | 12/1988 | Niskanen et al. |
| 4,823,477 A | 4/1989 | Soininen |
| 4,830,651 A | 5/1989 | Smith |
| 4,832,711 A | 5/1989 | Christel, Jr. |
| 4,836,894 A | 6/1989 | Chance |
| 4,838,996 A | 6/1989 | Kallmes |
| 4,845,978 A | 7/1989 | Whitford |
| 4,854,052 A | 8/1989 | Korpela et al. |
| 4,856,154 A | 8/1989 | Kainu et al. |
| 4,859,926 A | 8/1989 | Wolze |
| 4,873,407 A | 10/1989 | Smith |
| 4,874,467 A | 10/1989 | Karlsson |
| 4,878,781 A | 11/1989 | Gregory et al. |
| 4,882,852 A | 11/1989 | Kautto et al. |
| 4,888,882 A | 12/1989 | Ryham |
| 4,898,476 A | 2/1990 | Funken |
| 4,899,463 A | 2/1990 | Heikkila |
| 4,908,956 A | 3/1990 | Grund |
| 4,918,375 A | 4/1990 | Malicki |
| 4,928,013 A | 5/1990 | Anderson |
| 4,942,675 A | 7/1990 | Sundgvist |

(56) References Cited

U.S. PATENT DOCUMENTS

| | | |
|---|---|---|
| 4,942,808 A | 7/1990 | Benson |
| 4,944,385 A | 7/1990 | Shelby |
| 4,977,687 A | 12/1990 | Boissevain |
| 4,980,846 A | 12/1990 | Chapman |
| 4,987,280 A | 1/1991 | Kanafani |
| 4,988,408 A | 1/1991 | Evalahti |
| 4,990,751 A | 2/1991 | Nous |
| 5,009,016 A | 4/1991 | Ilmanen |
| 5,010,659 A | 4/1991 | Treleven |
| 5,011,573 A | 4/1991 | Niemi |
| 5,049,216 A | 9/1991 | Anderson |
| 5,062,066 A | 10/1991 | Scher |
| 5,065,673 A | 11/1991 | Taylor |
| 5,077,913 A | 1/1992 | Akerblom |
| 5,090,133 A | 2/1992 | Taylor |
| 5,092,407 A | 3/1992 | Laurenson |
| 5,093,795 A | 3/1992 | Lewis |
| 5,101,578 A | 4/1992 | Swanson |
| 5,106,655 A | 4/1992 | Beaman |
| 5,108,526 A | 4/1992 | Cornils |
| 5,115,582 A | 5/1992 | Westhead |
| 5,116,414 A | 5/1992 | Burton |
| 5,124,552 A | 6/1992 | Anderson |
| 5,133,185 A | 7/1992 | Gilbreath |
| 5,137,740 A | 8/1992 | Benson |
| 5,145,056 A | 9/1992 | Smith |
| 5,159,893 A | 11/1992 | Rantanen |
| 5,163,454 A | 11/1992 | Clemons |
| 5,167,979 A | 12/1992 | Benson |
| 5,170,357 A | 12/1992 | Negishi |
| 5,197,201 A | 3/1993 | Salin |
| 5,235,192 A | 8/1993 | Chase |
| 5,240,564 A | 8/1993 | Niskanen |
| 5,260,666 A | 11/1993 | Dishman |
| 5,262,955 A | 11/1993 | Lewis |
| 5,286,348 A | 2/1994 | Perin |
| 5,304,391 A | 4/1994 | Rantanen |
| 5,338,361 A | 8/1994 | Anderson |
| 5,342,486 A | 8/1994 | Jeffery |
| 5,355,595 A | 10/1994 | Koivukunnas |
| 5,355,649 A | 10/1994 | Berridge |
| 5,372,826 A | 12/1994 | Holz |
| 5,377,428 A | 1/1995 | Clark |
| 5,385,644 A | 1/1995 | Hannus |
| 5,387,782 A | 2/1995 | Holik |
| 5,400,258 A | 3/1995 | He |
| 5,416,979 A | 5/1995 | Joiner |
| 5,416,980 A | 5/1995 | Ilvespaa |
| 5,419,969 A | 5/1995 | Miyazaki |
| 5,437,107 A | 8/1995 | Ensign |
| 5,437,850 A | 8/1995 | Kroehl |
| 5,465,504 A | 11/1995 | Joiner |
| 5,466,176 A | 11/1995 | Cornell |
| 5,495,678 A | 3/1996 | Ilmarinen |
| 5,512,308 A | 4/1996 | Hsieh |
| 5,524,532 A | 6/1996 | Koivukunnas |
| 5,528,838 A | 6/1996 | Timm |
| 5,540,000 A | 7/1996 | Rosenburgh |
| 5,548,942 A | 8/1996 | Zajec |
| 5,560,350 A | 10/1996 | Kim |
| 5,570,521 A | 11/1996 | Baker |
| 5,571,944 A | 11/1996 | Pfeifer |
| 5,584,128 A | 12/1996 | Ensign |
| 5,601,236 A | 2/1997 | Wold |
| 5,603,806 A | 2/1997 | Kerttula |
| 5,607,553 A | 3/1997 | Chadha |
| 5,616,158 A | 4/1997 | Biedarra |
| 5,616,827 A | 4/1997 | Simmermon |
| 5,621,669 A | 4/1997 | Bjornsson |
| 5,626,667 A | 5/1997 | Bohle |
| 5,630,285 A | 5/1997 | Kerttula |
| 5,632,830 A | 5/1997 | Marschke |
| 5,636,126 A | 6/1997 | Heaven |
| 5,649,372 A | 7/1997 | Souza |
| 5,649,448 A | 7/1997 | Koskimies |
| 5,649,478 A | 7/1997 | Chadha |
| 5,653,041 A | 8/1997 | Ilmarinen |
| 5,654,799 A | 8/1997 | Chase |
| 5,667,641 A | 9/1997 | Poirier |
| 5,674,363 A | 10/1997 | Huovila |
| 5,680,987 A | 10/1997 | Taylor |
| 5,695,442 A | 12/1997 | Leung |
| 5,696,666 A | 12/1997 | Miles |
| 5,697,385 A | 12/1997 | Seymour |
| 5,711,087 A | 1/1998 | Pazdera |
| 5,747,904 A | 5/1998 | Sudhoff |
| 5,756,156 A | 5/1998 | Elijoki |
| 5,759,680 A | 6/1998 | Brooks |
| 5,763,559 A | 6/1998 | Black |
| 5,775,001 A | 7/1998 | Kerttula |
| 5,795,641 A | 8/1998 | Pauley |
| 5,817,704 A * | 10/1998 | Shiveley ............... A61F 13/53 521/63 |
| 5,821,498 A | 10/1998 | Niskanen |
| 5,825,653 A | 10/1998 | Huovila |
| 5,837,974 A | 11/1998 | Sissons |
| 5,842,853 A | 12/1998 | Bohle |
| 5,862,608 A | 1/1999 | Kotitschke |
| 5,862,613 A | 1/1999 | Kerttula |
| 5,884,225 A | 3/1999 | Allen |
| 5,890,372 A | 4/1999 | Belding |
| 5,893,055 A | 4/1999 | Chen |
| 5,912,072 A | 6/1999 | Trokhan |
| 5,915,813 A | 6/1999 | Joiner |
| 5,928,475 A | 7/1999 | Chase |
| 5,933,977 A | 8/1999 | Deshpande |
| 5,933,980 A | 8/1999 | Deshpande |
| 5,937,258 A | 8/1999 | Acquaviva |
| 5,937,538 A | 8/1999 | Joiner |
| 5,938,895 A | 8/1999 | Hirvonen |
| 5,942,130 A | 8/1999 | Leung |
| 5,942,322 A | 8/1999 | Ensign |
| 5,950,325 A | 9/1999 | Freeman |
| 5,964,956 A | 10/1999 | Straub |
| 5,965,075 A | 10/1999 | Pauley |
| 5,977,780 A | 11/1999 | Herrmann |
| 5,980,962 A | 11/1999 | Bracken |
| 5,985,893 A | 11/1999 | Yu |
| 5,994,045 A | 11/1999 | Bourdelais et al. |
| 6,003,327 A | 12/1999 | Belding |
| 6,018,909 A | 2/2000 | Potts |
| 6,020,704 A | 2/2000 | Buschur |
| 6,021,583 A | 2/2000 | Stelljes, Jr. |
| 6,030,447 A | 2/2000 | Duselis |
| 6,035,710 A | 3/2000 | Hutchison |
| 6,038,789 A | 3/2000 | Kaihovirta |
| 6,040,669 A | 3/2000 | Hog |
| 6,040,805 A | 3/2000 | Cheng |
| 6,045,730 A | 4/2000 | Potter |
| 6,053,040 A | 4/2000 | Callender |
| 6,053,093 A | 4/2000 | Gerhardt |
| 6,059,931 A | 5/2000 | Hu |
| 6,083,346 A | 7/2000 | Chen |
| 6,092,375 A | 7/2000 | Denniston |
| 6,094,604 A | 7/2000 | Bucher |
| 6,094,838 A | 8/2000 | Lang |
| 6,096,169 A | 8/2000 | Hermans |
| 6,098,309 A | 8/2000 | Halmschlager |
| 6,099,690 A | 8/2000 | Hu et al. |
| 6,105,276 A | 8/2000 | Ensign |
| 6,105,498 A | 8/2000 | Vrotacoe |
| 6,106,671 A | 8/2000 | Heaven et al. |
| 6,110,096 A | 8/2000 | Leung |
| 6,115,397 A | 9/2000 | Heritier |
| RE36,921 E | 10/2000 | Bushman et al. |
| 6,126,787 A | 10/2000 | Elijoki |
| 6,128,833 A | 10/2000 | Edelmann |
| 6,138,380 A | 10/2000 | Veijola |
| 6,143,092 A | 11/2000 | Straub |
| 6,149,767 A | 11/2000 | Hermans |
| 6,162,331 A | 12/2000 | Ruf |
| 6,169,848 B1 | 1/2001 | Henry |
| 6,176,976 B1 | 1/2001 | Carter |
| 6,179,964 B1 | 1/2001 | Begemann |

(56) References Cited

U.S. PATENT DOCUMENTS

| | | |
|---|---|---|
| 6,187,137 B1 | 2/2001 | Druecke |
| 6,187,139 B1 | 2/2001 | Edwards |
| 6,193,840 B1 | 2/2001 | Elijoki |
| 6,200,422 B1 | 3/2001 | Shakespeare |
| 6,200,425 B1 | 3/2001 | Pellinen |
| 6,210,616 B1 | 4/2001 | Suwanda |
| 6,228,220 B1 | 5/2001 | Hada |
| 6,245,995 B1 | 6/2001 | Coorod |
| 6,251,465 B1 | 6/2001 | Bello |
| 6,257,133 B1 | 7/2001 | Anderson |
| 6,264,792 B1 | 7/2001 | Kuosa |
| 6,273,638 B1 | 8/2001 | Clarkson |
| 6,274,001 B1 | 8/2001 | Mohan |
| 6,280,576 B1 | 8/2001 | Kuhasalo |
| 6,287,424 B1 | 9/2001 | Mohan |
| 6,299,808 B1 * | 10/2001 | Mork et al. ............ 264/46.1 |
| 6,306,257 B1 | 10/2001 | Hada |
| 6,318,727 B1 | 11/2001 | Hada |
| 6,322,666 B1 | 11/2001 | Luotama |
| 6,332,953 B1 | 12/2001 | Singh |
| 6,334,579 B1 | 1/2002 | Zarbi |
| 6,339,727 B1 | 1/2002 | Ladd |
| 6,340,412 B1 | 1/2002 | Niemi |
| 6,354,531 B1 | 3/2002 | Aalto |
| 6,365,004 B1 | 4/2002 | Hamstr |
| 6,379,496 B2 | 4/2002 | Edwards et al. |
| 6,383,338 B1 | 5/2002 | Meschenmoser |
| 6,387,218 B1 | 5/2002 | Graf |
| 6,393,729 B1 | 5/2002 | Forsman |
| 6,394,418 B1 | 5/2002 | Duan |
| 6,401,355 B1 | 6/2002 | Linnonmaa |
| 6,412,189 B1 | 7/2002 | Pellinen |
| 6,432,267 B1 | 8/2002 | Watson |
| 6,436,234 B1 | 8/2002 | Chen |
| 6,442,492 B1 | 8/2002 | Jackson |
| 6,447,583 B1 | 9/2002 | Thelen |
| 6,449,874 B2 | 9/2002 | Pellinen |
| 6,460,775 B1 | 10/2002 | Duan |
| 6,463,677 B2 | 10/2002 | Wolf |
| 6,463,794 B1 | 10/2002 | Moshe |
| 6,475,259 B1 | 11/2002 | Thomas |
| 6,485,610 B1 | 11/2002 | Loippo |
| 6,490,813 B1 | 12/2002 | Oechsle |
| 6,491,791 B1 | 12/2002 | Loippo |
| 6,497,790 B2 | 12/2002 | Mohan et al. |
| 6,523,278 B1 | 2/2003 | Coulson |
| 6,523,401 B2 | 2/2003 | Oechsle |
| 6,526,369 B1 | 2/2003 | Meinecke |
| 6,527,363 B1 | 3/2003 | Bowling |
| 6,533,889 B2 | 3/2003 | Dueholm |
| 6,544,156 B2 | 4/2003 | Anderson |
| 6,549,852 B2 | 4/2003 | Hanson |
| 6,551,454 B1 | 4/2003 | Ewens |
| 6,560,893 B1 | 5/2003 | Bakalar |
| 6,569,288 B1 | 5/2003 | Linnonmaa |
| 6,579,418 B2 | 6/2003 | Lindsay |
| 6,582,648 B1 | 6/2003 | Reif |
| 6,584,703 B1 | 7/2003 | Menpaa et al. |
| 6,589,388 B1 | 7/2003 | Nissinen |
| 6,596,316 B2 | 7/2003 | Lyons et al. |
| 6,602,341 B1 | 8/2003 | Hogg |
| 6,603,098 B2 | 8/2003 | Reddy |
| 6,605,185 B2 | 8/2003 | Sasaki et al. |
| 6,612,158 B2 | 9/2003 | Huuskonen |
| 6,644,098 B2 | 11/2003 | Cardinale |
| 6,647,312 B2 | 11/2003 | Sasaki et al. |
| 6,655,046 B2 | 12/2003 | Schfer |
| 6,655,195 B2 | 12/2003 | Grabscheid |
| 6,675,494 B1 | 1/2004 | Oechsle |
| 6,683,297 B2 | 1/2004 | Schulz |
| 6,694,266 B1 | 2/2004 | Jackson |
| 6,694,870 B1 | 2/2004 | Pietikinen |
| 6,699,362 B1 | 3/2004 | Rautiainen |
| 6,699,365 B2 | 3/2004 | Duan |
| 6,707,008 B2 | 3/2004 | Roehr |
| 6,708,608 B2 | 3/2004 | Viljanmaa |
| 6,712,935 B2 | 3/2004 | Goodall |
| 6,712,937 B1 | 3/2004 | Oechsle |
| 6,712,938 B1 | 3/2004 | Leppkoski |
| 6,715,630 B2 | 4/2004 | Littlejohn |
| 6,716,316 B2 | 4/2004 | Grabscheid |
| 6,728,592 B2 | 4/2004 | Wells |
| 6,736,935 B2 | 5/2004 | Hermans |
| 6,749,368 B2 | 6/2004 | Ankeny |
| 6,749,888 B2 | 6/2004 | Linnonmaa |
| 6,752,907 B2 | 6/2004 | Edwards |
| 6,772,533 B2 | 8/2004 | Hassinen |
| 6,775,924 B2 | 8/2004 | Bruntz |
| 6,779,440 B2 | 8/2004 | Pekka et al. |
| 6,780,284 B2 | 8/2004 | Almi |
| 6,790,536 B2 | 9/2004 | Schnleber |
| 6,802,513 B2 | 10/2004 | Ranzau |
| 6,805,899 B2 | 10/2004 | MacHattie |
| 6,807,510 B1 | 10/2004 | Backstrom |
| 6,813,941 B2 | 11/2004 | Beuther |
| 6,834,550 B2 | 12/2004 | Upadhyaya et al. |
| 6,835,283 B2 | 12/2004 | Weigant |
| 6,849,851 B2 | 2/2005 | Komulainen |
| 6,860,030 B1 | 3/2005 | Graf |
| 6,860,033 B2 | 3/2005 | Latti |
| 6,863,919 B1 | 3/2005 | Maenpaa |
| 6,866,360 B2 | 3/2005 | de Pena |
| 6,868,623 B2 | 3/2005 | Bjornberg |
| 6,869,031 B2 | 3/2005 | Duan |
| 6,890,407 B1 | 5/2005 | Koivukunnas |
| 6,901,334 B2 | 5/2005 | Linsen |
| 6,901,352 B2 | 5/2005 | Woods |
| 6,903,557 B2 | 6/2005 | Holmes |
| 6,929,716 B2 | 8/2005 | Munch et al. |
| 6,936,794 B2 | 8/2005 | Zhang |
| 6,941,875 B2 | 9/2005 | Norton et al. |
| 6,953,516 B2 | 10/2005 | Hermans |
| 6,958,691 B1 | 10/2005 | Anderson et al. |
| 6,962,296 B2 | 11/2005 | Hamel |
| 6,964,117 B2 | 11/2005 | Parent |
| 6,965,099 B1 | 11/2005 | Habeger, Jr. |
| 6,971,187 B1 | 12/2005 | Pikal |
| 6,975,472 B2 | 12/2005 | Stover |
| 6,981,499 B2 | 1/2006 | Anderson et al. |
| 6,998,021 B2 | 2/2006 | Mantyla |
| 7,004,177 B2 | 2/2006 | Demmer |
| 7,017,279 B2 | 3/2006 | Almi |
| 7,042,234 B2 | 5/2006 | Buss |
| 7,047,153 B2 | 5/2006 | Woods-Coe |
| 7,059,066 B2 | 6/2006 | Maurer |
| 7,067,039 B2 | 6/2006 | Almi |
| 7,068,051 B2 | 6/2006 | Anderson et al. |
| 7,114,689 B2 | 10/2006 | Anderson, II |
| 7,129,713 B2 | 10/2006 | Katz |
| 7,134,998 B2 | 11/2006 | Endo et al. |
| 7,141,141 B1 | 11/2006 | Koskinen |
| 7,146,238 B2 | 12/2006 | Burma |
| 7,149,650 B2 | 12/2006 | Grabscheid |
| 7,160,418 B2 | 1/2007 | Edwards |
| 7,164,145 B2 | 1/2007 | Shakespeare |
| 7,168,597 B1 | 1/2007 | Jones |
| 7,169,720 B2 | 1/2007 | Etchells et al. |
| 7,175,853 B1 | 2/2007 | Bracht |
| 7,191,777 B2 | 3/2007 | Brand |
| 7,193,032 B2 | 3/2007 | Culbert |
| 7,219,024 B2 | 5/2007 | Gamache |
| 7,225,558 B2 | 6/2007 | Hagen |
| 7,226,630 B2 | 6/2007 | Loh |
| 7,239,451 B2 | 7/2007 | Suzuki |
| 7,241,805 B2 | 7/2007 | Oberegger |
| 7,246,466 B2 | 7/2007 | Turner |
| 7,249,424 B2 | 7/2007 | Lipponen |
| 7,263,808 B2 | 9/2007 | Massey |
| 7,278,186 B2 | 10/2007 | Irick et al. |
| 7,286,956 B2 | 10/2007 | Floyd et al. |
| 7,291,856 B2 | 11/2007 | Haran |
| 7,294,838 B2 | 11/2007 | Rae |
| 7,303,777 B2 | 12/2007 | Baas et al. |
| 7,321,425 B2 | 1/2008 | Haran |

(56) References Cited

U.S. PATENT DOCUMENTS

| | | |
|---|---|---|
| 7,322,355 B2 | 1/2008 | Jones |
| 7,322,484 B2 | 1/2008 | Batten |
| 7,324,904 B2 | 1/2008 | Floyd et al. |
| 7,363,112 B2 | 4/2008 | Cartwright |
| 7,367,164 B2 | 5/2008 | Burton et al. |
| 7,383,721 B2 | 6/2008 | Parsons et al. |
| 7,383,837 B2 | 6/2008 | Robertson et al. |
| 7,384,509 B2 | 6/2008 | Heikkinen |
| 7,384,516 B2 | 6/2008 | Fitzpatrick et al. |
| 7,404,262 B2 | 7/2008 | Jurkovich et al. |
| 7,407,562 B2 | 8/2008 | Heikkinen et al. |
| 7,413,380 B2 | 8/2008 | Corwon |
| 7,429,311 B2 | 9/2008 | Pietikainen |
| 7,441,344 B1 | 10/2008 | Savarese |
| 7,445,377 B2 | 11/2008 | Lee |
| 7,445,830 B2 | 11/2008 | Van Dijk |
| 7,452,447 B2 | 11/2008 | Duan et al. |
| 7,454,253 B2 | 11/2008 | Fan |
| 7,459,061 B2 | 12/2008 | Passiniemi |
| 7,459,062 B2 | 12/2008 | Mayer |
| 7,467,629 B2 | 12/2008 | Rand |
| 7,494,567 B2 | 2/2009 | Haran |
| 7,496,413 B2 | 2/2009 | Fan |
| 7,513,975 B2 | 4/2009 | Burma |
| 7,514,030 B2 | 4/2009 | Nilsson et al. |
| 7,524,547 B2 | 4/2009 | Beach |
| 7,558,673 B1 | 7/2009 | Qu |
| 7,571,061 B2 | 8/2009 | Cai |
| 7,575,659 B2 | 8/2009 | Billings |
| 7,584,652 B2 | 9/2009 | Floyd |
| 7,592,608 B2 | 9/2009 | Shakespeare et al. |
| 7,608,169 B2 | 10/2009 | Backstrom et al. |
| 7,609,366 B2 | 10/2009 | MacHattie et al. |
| 7,617,717 B2 | 11/2009 | Luchinger |
| 7,627,959 B2 | 12/2009 | Reinhardt et al. |
| 7,630,847 B2 | 12/2009 | Jones, III et al. |
| 7,634,860 B2 | 12/2009 | Hamel |
| 7,651,775 B2 | 1/2010 | Suzuki et al. |
| 7,658,873 B2 | 2/2010 | Chen |
| 7,662,257 B2 | 2/2010 | Edwards |
| 7,695,746 B2 | 4/2010 | Bows |
| 7,704,351 B2 | 4/2010 | Lipponen |
| 7,718,943 B2 | 5/2010 | Johnson et al. |
| 7,755,368 B2 | 7/2010 | Herrmann |
| 7,759,947 B2 | 7/2010 | Kaufmann |
| 7,767,940 B2 | 8/2010 | Gerth |
| 7,777,496 B2 | 8/2010 | Evans |
| 7,780,817 B2 | 8/2010 | Hellstrom |
| 7,799,170 B2 | 9/2010 | Shakespeare et al. |
| 7,811,417 B2 | 10/2010 | MacHattie |
| 7,812,947 B2 | 10/2010 | Shakespeare |
| 7,818,934 B2 | 10/2010 | Hall |
| 7,819,790 B2 | 10/2010 | Grischenko et al. |
| 7,820,012 B2 | 10/2010 | Stewart |
| 7,827,751 B2 | 11/2010 | Plante |
| 7,832,169 B2 | 11/2010 | Engstrom |
| 7,851,712 B2 | 12/2010 | Luchinger |
| 7,857,777 B2 | 12/2010 | Larson et al. |
| 7,861,673 B2 | 1/2011 | Huisinga et al. |
| 7,871,494 B2 | 1/2011 | Viaser |
| 7,880,156 B2 | 2/2011 | Shakespeare |
| 7,887,867 B2 | 2/2011 | Abboud |
| 7,891,114 B2 | 2/2011 | Lasonde |
| 7,892,584 B2 | 2/2011 | Castillo et al. |
| 7,911,212 B2 | 3/2011 | Herrmann |
| 7,923,670 B2 | 4/2011 | Hirano |
| 7,931,928 B2 | 4/2011 | Emerson |
| 7,938,935 B2 | 5/2011 | MacHattie |
| 7,944,220 B2 | 5/2011 | Lock |
| 7,946,557 B2 | 5/2011 | Chirico |
| 7,955,471 B2 | 6/2011 | Kesselmayer |
| 7,956,624 B2 | 6/2011 | Beaulieu |
| 7,962,250 B2 | 6/2011 | Bretzner |
| 7,964,064 B2 | 6/2011 | Weinstein |
| 7,989,732 B2 | 8/2011 | Karogal |
| 8,028,988 B2 | 10/2011 | Shakespeare |
| 8,029,648 B2 | 10/2011 | Spindler |
| 8,039,031 B2 | 10/2011 | Baianu |
| 8,043,642 B2 | 10/2011 | Schonemann |
| 8,092,650 B2 | 1/2012 | Munch et al. |
| 8,155,932 B2 | 4/2012 | Berggren et al. |
| 8,187,424 B2 | 5/2012 | Haran et al. |
| 8,209,048 B2 | 6/2012 | Zehnpfund et al. |
| 8,225,810 B2 | 7/2012 | Blanchard |
| 8,245,383 B2 | 8/2012 | Mann et al. |
| 8,248,610 B2 | 8/2012 | Kokko et al. |
| 8,261,465 B2 | 9/2012 | Mayer et al. |
| 8,277,609 B2 | 10/2012 | Hermans et al. |
| 8,282,781 B2 | 10/2012 | Shakespeare et al. |
| 8,294,230 B2 | 10/2012 | Yamagata et al. |
| 8,308,561 B2 | 11/2012 | Mattice et al. |
| 8,343,290 B2 | 1/2013 | Hueneke et al. |
| 8,343,564 B2 | 1/2013 | Kerr et al. |
| 8,372,771 B2 | 2/2013 | Benham et al. |
| 8,403,596 B2 | 3/2013 | Schafer et al. |
| 8,415,595 B2 | 4/2013 | Chirico et al. |
| 8,449,680 B2 | 5/2013 | Burke et al. |
| 8,489,221 B2 | 7/2013 | Nuyan et al. |
| 8,506,662 B2 | 8/2013 | Makinen |
| 8,507,462 B2 | 8/2013 | Qi et al. |
| 8,511,766 B2 | 8/2013 | Sonnenfroh et al. |
| 8,517,963 B2 | 8/2013 | Larson et al. |
| 8,529,660 B2 | 9/2013 | Diekmeyer et al. |
| 8,571,715 B2 | 10/2013 | Runkana et al. |
| 8,608,095 B2 | 12/2013 | Naundorf et al. |
| 2001/0035273 A1 | 11/2001 | Kuhasalo et al. |
| 2001/0037582 A1 | 11/2001 | Ringer et al. |
| 2001/0054239 A1 | 12/2001 | Ringer et al. |
| 2002/0088137 A1 | 7/2002 | Savarese |
| 2002/0141945 A1 | 10/2002 | Billingsley et al. |
| 2002/0189612 A1 | 12/2002 | Rand |
| 2003/0000935 A1 | 1/2003 | Foster et al. |
| 2003/0015325 A1 | 1/2003 | Vienot |
| 2003/0016029 A1 | 1/2003 | Lowery et al. |
| 2003/0021819 A1 | 1/2003 | Head et al. |
| 2003/0033727 A1 | 2/2003 | Ensign et al. |
| 2003/0074852 A1 | 4/2003 | Knabenschuh |
| 2003/0121323 A1 | 7/2003 | Beuther et al. |
| 2003/0172700 A1 | 9/2003 | Ciaccio et al. |
| 2004/0025871 A1 | 2/2004 | Davies |
| 2004/0050385 A1 | 3/2004 | Bonney et al. |
| 2004/0050517 A1 | 3/2004 | Juppi et al. |
| 2004/0060676 A1 | 4/2004 | Gron et al. |
| 2004/0079039 A1 | 4/2004 | Shaw |
| 2004/0086606 A1 | 5/2004 | Roehr et al. |
| 2004/0231667 A1 | 11/2004 | Foster et al. |
| 2005/0003083 A1 | 1/2005 | Lipponen et al. |
| 2005/0011624 A1 | 1/2005 | Korhonen et al. |
| 2005/0022806 A1 | 2/2005 | Beaumont et al. |
| 2005/0098284 A1 | 5/2005 | Heikkinen et al. |
| 2005/0098290 A1 | 5/2005 | Komposch et al. |
| 2005/0197657 A1 | 9/2005 | Goth et al. |
| 2005/0199842 A1 | 9/2005 | Parsons et al. |
| 2005/0202268 A1 | 9/2005 | Kotter et al. |
| 2005/0251289 A1 | 11/2005 | Bonney et al. |
| 2005/0251976 A1 | 11/2005 | Lipponen et al. |
| 2006/0062889 A1 | 3/2006 | Houston et al. |
| 2006/0183391 A1 | 8/2006 | Crook et al. |
| 2006/0185809 A1 | 8/2006 | Elfrink et al. |
| 2006/0194490 A1 | 8/2006 | Hodson et al. |
| 2006/0194902 A1 | 8/2006 | Nie et al. |
| 2006/0240150 A1 | 10/2006 | Delaney et al. |
| 2006/0266229 A1 | 11/2006 | Ribich |
| 2006/0276317 A1 | 12/2006 | Pietikainen et al. |
| 2007/0044402 A1 | 3/2007 | Hess |
| 2007/0044416 A1 | 3/2007 | Van Dijk |
| 2007/0142882 A1 | 6/2007 | Quincy et al. |
| 2007/0191694 A1 | 8/2007 | Sherman et al. |
| 2007/0209228 A1 | 9/2007 | Meerpohl et al. |
| 2007/0224418 A1 | 9/2007 | Van Dijk et al. |
| 2007/0240376 A1 | 10/2007 | Engstrom |
| 2008/0029234 A1 | 2/2008 | Latti et al. |
| 2008/0057152 A1 | 3/2008 | Miller et al. |
| 2008/0124428 A1 | 5/2008 | Reeve et al. |

(56) References Cited

U.S. PATENT DOCUMENTS

| | | |
|---|---|---|
| 2008/0124508 A1 | 5/2008 | Sato |
| 2008/0236776 A1 | 10/2008 | Begemann |
| 2008/0245359 A1 | 10/2008 | Williamson |
| 2008/0248294 A1 | 10/2008 | Cohen et al. |
| 2008/0262116 A1 | 10/2008 | Simpson et al. |
| 2008/0311279 A1 | 12/2008 | Kortum et al. |
| 2008/0314538 A1 | 12/2008 | Kabus |
| 2009/0017178 A1 | 1/2009 | Desai et al. |
| 2009/0046759 A1 | 2/2009 | Lee et al. |
| 2009/0126219 A1 | 5/2009 | Mathis, Jr. et al. |
| 2009/0133282 A1 | 5/2009 | Rasanen et al. |
| 2009/0203277 A1 | 8/2009 | Crook et al. |
| 2009/0229777 A1 | 9/2009 | Tran et al. |
| 2009/0255922 A1 | 10/2009 | Chirico et al. |
| 2009/0258771 A1 | 10/2009 | Chirico et al. |
| 2009/0280909 A1 | 11/2009 | McEniry |
| 2009/0324586 A1 | 12/2009 | Tchessalov et al. |
| 2010/0024806 A1 | 2/2010 | Burke et al. |
| 2010/0043326 A1 | 2/2010 | Koester |
| 2010/0163549 A1 | 7/2010 | Gagas et al. |
| 2010/0175341 A1 | 7/2010 | Gilbert et al. |
| 2010/0198364 A1 | 8/2010 | Chen et al. |
| 2010/0200570 A1 | 8/2010 | Chirico et al. |
| 2010/0266734 A1 | 10/2010 | Bows et al. |
| 2011/0027606 A1 | 2/2011 | Lenhardt |
| 2011/0076511 A1 | 3/2011 | Paolilli et al. |
| 2011/0138753 A1 | 6/2011 | Justice et al. |
| 2011/0158555 A1 | 6/2011 | Chang et al. |
| 2011/0160919 A1 | 6/2011 | Orr et al. |
| 2011/0162228 A1 | 7/2011 | Park et al. |
| 2011/0190688 A1 | 8/2011 | Tagliaferri et al. |
| 2011/0238226 A1 | 9/2011 | Schmidt et al. |
| 2011/0244186 A1 | 10/2011 | Dou et al. |
| 2011/0262384 A1 | 10/2011 | Lalor et al. |
| 2013/0078364 A9 | 3/2013 | Von Drasek et al. |

\* cited by examiner

METHOD OF DEWATERING IN A CONTINUOUS HIGH INTERNAL PHASE EMULSION FOAM FORMING PROCESS

CROSS REFERENCE TO RELATED APPLICATION

This application claims the benefit of U.S. Provisional Application Ser. No. 61/618,342 filed Mar. 30, 2012; incorporated herein by reference.

FIELD OF THE INVENTION

This application relates to producing High Internal Phase Emulsion (HIPE) foams using a continuous process.

BACKGROUND OF THE INVENTION

An emulsion is a dispersion of one liquid in another liquid and generally is in the form of a water-in-oil mixture having an aqueous or water phase dispersed within a substantially immiscible continuous oil phase. Water-in-oil (or oil in water) emulsions having a high ratio of dispersed phase to continuous phase are known in the art as High Internal Phase Emulsions, also referred to as "HIPE" or HIPEs. At relatively high dispersed aqueous phase to continuous oil phase ratios the continuous oil phase becomes essentially a thin film separating and coating the droplet-like structures of the internal, dispersed aqueous phase. In certain HIPEs continuous oil phase can have one or more polymerizable monomers. These monomers can be polymerized, forming a cellular structure, for example a foam, having a cell size distribution defined by the size distribution of the dispersed, aqueous phase droplets.

HIPE foams can be formed in a continuous process, wherein a HIPE is formed and then moved through the various stages used to produce a HIPE foam. A movable support member, such as a belt, will typically be used to move a HIPE from one stage to the next. Following the formation of the HIPE the next stage involves the polymerization of the monomers present in the oil phase to produce a HIPE foam. Initiator, which is used to start polymerization, is generally added during HIPE formation either to the separate aqueous and continuous oil phases or to the HIPE during the emulsion making process. In addition to the presence of initiator, heat can be used to accelerate the polymerization reaction, for example the individual aqueous and oil phases may be heated to accelerate the polymerization reaction.

After polymerization occurs, the resulting HIPE foam is saturated with aqueous phase that needs to be removed to obtain substantially dry HIPE foam. HIPE foams can be squeezed free of most of the aqueous phase by using compression, for example, by running the HIPE foam through one or more pairs of nip rollers. The nip rollers can be positioned such that they squeeze the aqueous phase out of the HIPE foam. Because there is a need to create HIPE foam with a level of uniformity, the saturated aqueous phase should be squeezed out while maintaining a uniform cross direction moisture and salt profile while increasing possible belt width.

Therefore there exists a need for a way to improve aqueous phase removal from a HIPE foam using a nip to create a uniform cross direction moisture and salt profile while increasing belt width.

SUMMARY OF THE INVENTION

A method for producing a High Internal Phase Emulsion foam is provided. The method includes the steps of forming a High Internal Phase Emulsion from an oil phase having monomer, a cross-linking agent, an emulsifier, and an aqueous phase. Providing an extrusion device, a belt having a cross directional width, a nip roller, and a vacuum. The method further includes extruding the High Internal Phase Emulsion on the belt, polymerizing the monomer component in the oil phase of the High Internal Phase Emulsion, and passing the High Internal Phase Emulsion through the nip roller and vacuum to remove a saturated aqueous phase. The vacuum includes a nip insert.

A nip insert capable of raising a vacuum box wherein the nip insert made of one or more layers of tape, a bolt, a washer, a screw, and/or any other known item capable of propping an isolated point.

DETAILED DESCRIPTION OF THE INVENTION

The present invention relates to a method for continuous High Internal Phase Emulsion (HIPE) foam production. A HIPE is produced and then extruded onto a belt. The belt moves in a horizontal direction to transport the HIPE from the extrusion point to the following stages of HIPE foam production. After extrusion on the belt, the HIPE is polymerized. Following polymerization, the resulting HIPE foam is saturated with aqueous phase that needs to be removed to obtain a substantially dry HIPE foam. Removal of the saturated aqueous phase or dewatering may occur using nip rollers, and vacuum. Nip shims or inserts are placed under the vacuum at fixed intervals along the cross direction of the belt.

A High Internal Phase Emulsion (HIPE) can have two phases. One phase is a continuous oil phase having monomers that are polymerized to form a HIPE foam and an emulsifier to help stabilize the HIPE. The oil phase may also include one or more photoinitiators. The monomer component may be present in an amount of from about 80% to about 99%, and in certain embodiments from about 85% to about 95% by weight of the oil phase. The emulsifier component, which is soluble in the oil phase and suitable for forming a stable water-in-oil emulsion may be present in the oil phase in an amount of from about 1% to about 20% by weight of the oil phase. The emulsion may be formed at an emulsification temperature of from about 20° C. to about 130° C. and in certain embodiments from about 50° C. to about 100° C.

In general, the monomers will include from about 20% to about 97% by weight of the oil phase at least one substantially water-insoluble monofunctional alkyl acrylate or alkyl methacrylate. For example, monomers of this type may include $C_4$-$C_{18}$ alkyl acrylates and $C_2$-$C_{18}$ methacrylates, such as ethylhexyl acrylate, butyl acrylate, hexyl acrylate, octyl acrylate, nonyl acrylate, decyl acrylate, isodecyl acrylate, tetradecyl acrylate, benzyl acrylate, nonyl phenyl acrylate, hexyl methacrylate, 2-ethylhexyl methacrylate, octyl methacrylate, nonyl methacrylate, decyl methacrylate, isodecyl methacrylate, dodecyl methacrylate, tetradecyl methacrylate, and octadecyl methacrylate.

The oil phase may also have from about 2% to about 40%, and in certain embodiments from about 10% to about 30%, by weight of the oil phase, a substantially water-insoluble, polyfunctional crosslinking alkyl acrylate or methacrylate. This crosslinking comonomer, or crosslinker, is added to confer strength and resilience to the resulting HIPE foam. Examples of crosslinking monomers of this type may have monomers containing two or more activated acrylate, methacrylate groups, or combinations thereof. Nonlimiting examples of this group include 1,6-hexanedioldiacrylate, 1,4-butanedioldimethacrylate, trimethylolpropane triacrylate, trimethylolpropane trimethacrylate, 1,12-dodecyldimethacrylate, 1,14-tetradecanedioldimethacrylate, ethylene glycol dimethacrylate, neopentyl glycol diacrylate (2,2-dimethylpropanediol diacrylate), hexanediol acrylate methacrylate, glucose pentaacrylate, sorbitan pentaacrylate, and the like. Other examples of crosslinkers contain a mixture of acrylate and methacrylate moieties, such as ethylene glycol acrylate-methacrylate and neopentyl glycol acrylate-methacrylate. The ratio of methacrylate:acrylate group in the mixed crosslinker may be varied from 50:50 to any other ratio as needed.

Any third substantially water-insoluble comonomer may be added to the oil phase in weight percentages of from about 0% to about 15% by weight of the oil phase, in certain embodiments from about 2% to about 8%, to modify properties of the HIPE foams. In certain embodiments, "toughening" monomers may be desired which impart toughness to the resulting HIPE foam. These include monomers such as styrene, vinyl chloride, vinylidene chloride, isoprene, and chloroprene. Without being bound by theory, it is believed that such monomers aid in stabilizing the HIPE during polymerization (also known as "curing") to provide a more homogeneous and better formed HIPE foam which results in better toughness, tensile strength, abrasion resistance, and the like. Monomers may also be added to confer flame retardancy as disclosed in U.S. Pat. No. 6,160,028 (Dyer) issued Dec. 12, 2000. Monomers may be added to confer color, for example vinyl ferrocene, fluorescent properties, radiation resistance, opacity to radiation, for example lead tetraacrylate, to disperse charge, to reflect incident infrared light, to absorb radio waves, to form a wettable surface on the HIPE foam struts, or for any other desired property in a HIPE foam. In some cases, these additional monomers may slow the overall process of conversion of HIPE to HIPE foam, the tradeoff being necessary if the desired property is to be conferred. Thus, such monomers can be used to slow down the polymerization rate of a HIPE. Examples of monomers of this type can have styrene and vinyl chloride.

The oil phase may further contain an emulsifier used for stabilizing the HIPE. Emulsifiers used in a HIPE can include: (a) sorbitan monoesters of branched $C_{16}$-$C_{24}$ fatty acids; linear unsaturated $C_{16}$-$C_{22}$ fatty acids; and linear saturated $C_{12}$-$C_{14}$ fatty acids, such as sorbitan monooleate, sorbitan monomyristate, and sorbitan monoesters, sorbitan monolaurate diglycerol monooleate (DGMO), polyglycerol monoisostearate (PGMIS), and polyglycerol monomyristate (PGMM); (b) polyglycerol monoesters of -branched $C_{16}$-$C_{24}$ fatty acids, linear unsaturated $C_{16}$-$C_{22}$ fatty acids, or linear saturated $C_{12}$-$C_{14}$ fatty acids, such as diglycerol monooleate (for example diglycerol monoesters of C18:1 fatty acids), diglycerol monomyristate, diglycerol monoisostearate, and diglycerol monoesters; (c) diglycerol monoaliphatic ethers of -branched $C_{16}$-$C_{24}$ alcohols, linear unsaturated $C_{16}$-$C_{22}$ alcohols, and linear saturated $C_{12}$-$C_{14}$ alcohols, and mixtures of these emulsifiers. See U.S. Pat. No. 5,287,207 (Dyer et al.), issued Feb. 7, 1995 and U.S. Pat. No. 5,500,451 (Goldman et al.) issued Mar. 19, 1996. Another emulsifier that may be used is polyglycerol succinate (PGS), which is formed from an alkyl succinate, glycerol, and triglycerol.

Such emulsifiers, and combinations thereof, may be added to the oil phase so that they can have between about 1% and about 20%, in certain embodiments from about 2% to about 15%, and in certain other embodiments from about 3% to about 12% by weight of the oil phase. In certain embodiments, coemulsifiers may also be used to provide additional control of cell size, cell size distribution, and emulsion stability, particularly at higher temperatures, for example greater than about 65° C. Examples of coemulsifiers include phosphatidyl cholines and phosphatidyl choline-containing compositions, aliphatic betaines, long chain $C_{12}$-$C_{22}$ dialiphatic quaternary ammonium salts, short chain $C_1$-$C_4$ dialiphatic quaternary ammonium salts, long chain $C_{12}$-$C_{22}$ dialkoyl(alkenoyl)-2-hydroxyethyl, short chain $C_1$-$C_4$ dialiphatic quaternary ammonium salts, long chain $C_{12}$-$C_{22}$ dialiphatic imidazolinium quaternary ammonium salts, short chain $C_1$-$C_4$ dialiphatic imidazolinium quaternary ammonium salts, long chain $C_{12}$-$C_{22}$ monoaliphatic benzyl quaternary ammonium salts, long chain $C_{12}$-$C_{22}$ dialkoyl(alkenoyl)-2-aminoethyl, short chain $C_1$-$C_4$ monoaliphatic benzyl quaternary ammonium salts, short chain $C_1$-$C_4$ monohydroxyaliphatic quaternary ammonium salts. In certain embodiments, ditallow dimethyl ammonium methyl sulfate (DTDMAMS) may be used as a coemulsifier.

The oil phase may comprise a photoinitiator at between about 0.05% and about 10%, and in certain embodiments between about 0.2% and about 10% by weight of the oil phase. Lower amounts of photoinitiator allow light to better penetrate the HIPE foam, which can provide for polymerization deeper into the HIPE foam. However, if polymerization is done in an oxygen-containing environment, there should be enough photoinitiator to initiate the polymerization and overcome oxygen inhibition. Photoinitiators can respond rapidly and efficiently to a light source with the production of radicals, cations, and other species that are capable of initiating a polymerization reaction. The photoinitiators used in the present invention may absorb UV light at wavelengths of about 200 nanometers (nm) to about 800 nm, in certain embodiments about 200 nm to about 350 nm. If the photoinitiator is in the oil phase, suitable types of oil-soluble photoinitiators include benzyl ketals, α-hydroxyalkyl phenones, α-amino alkyl phenones, and acylphospine oxides. Examples of photoinitiators include 2,4,6-[trimethylbenzoyldiphosphine]oxide in combination with 2-hydroxy-2-methyl-1-phenylpropan-1-one (50:50 blend of the two is sold by Ciba Speciality Chemicals, Ludwigshafen, Germany as DAROCUR® 4265); benzyl dimethyl ketal (sold by Ciba Geigy as IRGACURE 651); α-,α-dimethoxy-α-hydroxy acetophenone (sold by Ciba Speciality Chemicals as DAROCUR® 1173); 2-methyl-1-[4-(methyl thio) phenyl]-2-morpholino-propan-1-one (sold by Ciba Speciality Chemicals as IRGACURE® 907); 1-hydroxycyclohexyl-phenyl ketone (sold by Ciba Speciality Chemicals as IRGACURE® 184); bis(2,4,6-trimethylbenzoyl)-phenylphosphineoxide (sold by Ciba Speciality Chemicals as IRGACURE 819); diethoxyacetophenone, and 4-(2-hydroxyethoxy)phenyl-(2-hydroxy-2-methylpropyl) ketone (sold by Ciba Speciality Chemicals as IRGACURE® 2959); and Oligo[2-hydroxy-2-methyl-1-[4-(1-methylvinyl)phenyl]propanone] (sold by Lamberti spa, Gallarate, Italy as ESACURE® KIP EM.

The dispersed aqueous phase of a HIPE can have water, and may also have one or more components, such as initiator, photoinitiator, or electrolyte, wherein in certain embodiments, the one or more components are at least partially water soluble.

One component of the aqueous phase may be a water-soluble electrolyte. The water phase may contain from about 0.2% to about 40%, in certain embodiments from about 2% to about 20%, by weight of the aqueous phase of a water-soluble electrolyte. The electrolyte minimizes the tendency of monomers, comonomers, and crosslinkers that are primarily oil soluble to also dissolve in the aqueous phase. Examples of electrolytes include chlorides or sulfates of alkaline earth metals such as calcium or magnesium and chlorides or sulfates of alkali earth metals such as sodium. Such electrolyte can include a buffering agent for the control of pH during the polymerization, including such inorganic counterions as phosphate, borate, and carbonate, and mixtures thereof. Water soluble monomers may also be used in the aqueous phase, examples being acrylic acid and vinyl acetate.

Another component that may be present in the aqueous phase is a water-soluble free-radical initiator. The initiator can be present at up to about 20 mole percent based on the total moles of polymerizable monomers present in the oil phase. In certain embodiments, the initiator is present in an amount of from about 0.001 to about 10 mole percent based on the total moles of polymerizable monomers in the oil phase. Suitable initiators include ammonium persulfate, sodium persulfate, potassium persulfate, 2,2'-azobis(N,N'-dimethyleneisobutyramidine)dihydrochloride, and other suitable azo initiators. In certain embodiments, to reduce the potential for premature polymerization which may clog the emulsification system, addition of the initiator to the monomer phase may be just after or near the end of emulsification.

Photoinitiators present in the aqueous phase may be at least partially water soluble and can have between about 0.05% and about 10%, and in certain embodiments between about 0.2% and about 10% by weight of the aqueous phase. Lower amounts of photoinitiator allow light to better penetrate the HIPE foam, which can provide for polymerization deeper into the HIPE foam. However, if polymerization is done in an oxygen-containing environment, there should be enough photoinitiator to initiate the polymerization and overcome oxygen inhibition. Photoinitiators can respond rapidly and efficiently to a light source with the production of radicals, cations, and other species that are capable of initiating a polymerization reaction. The photoinitiators used in the present invention may absorb UV light at wavelengths of from about 200 nanometers (nm) to about 800 nm, in certain embodiments from about 200 nm to about 350 nm, and in certain embodiments from about 350 nm to about 450 nm. If the photoinitiator is in the aqueous phase, suitable types of water-soluble photoinitiators include benzophenones, benzils, and thioxanthones. Examples of photoinitiators include 2,2'-Azobis[2-(2-imidazolin-2-yl)propane]dihydrochloride; 2,2'-Azobis[2-(2-imidazolin-2-yl)propane] disulfate dehydrate; 2,2'-Azobis(1-imino-1-pyrrolidino-2-ethylpropane)dihydrochloride; 2,2'-Azobis[2-methyl-N-(2-hydroxyethyl)propionamide]; 2,2'-Azobis(2-methylpropionamidine)dihydrochloride; 2,2'-dicarboxymethoxydibenzalacetone, 4,4'-dicarboxymethoxydibenzalacetone, 4,4'-dicarboxymethoxydibenzalcyclohexanone, 4-dimethylamino-4'-carboxymethoxydibenzalacetone; and 4,4'-disulphoxymethoxydibenzalacetone. Other suitable photoinitiators that can be used in the present invention are listed in U.S. Pat. No. 4,824,765 (Sperry et al.) issued Apr. 25, 1989.

In addition to the previously described components other components may be included in either the aqueous or oil phase of a HIPE. Examples include antioxidants, for example hindered phenolics, hindered amine light stabilizers; plasticizers, for example dioctyl phthalate, dinonyl sebacate; flame retardants, for example halogenated hydrocarbons, phosphates, borates, inorganic salts such as antimony trioxide or ammonium phosphate or magnesium hydroxide; dyes and pigments; fluorescers; filler particles, for example starch, titanium dioxide, carbon black, or calcium carbonate; fibers; chain transfer agents; odor absorbers, for example activated carbon particulates; dissolved polymers; dissolved oligomers; and the like.

HIPE foam is produced from the polymerization of the monomers having the continuous oil phase of a HIPE. In certain embodiments, HIPE foams may have one or more layers, and may be either homogeneous or heterogeneous polymeric open-celled foams. Homogeneity and heterogeneity relate to distinct layers within the same HIPE foam, which are similar in the case of homogeneous HIPE foams or which differ in the case of heterogeneous HIPE foams. A heterogeneous HIPE foam may contain at least two distinct layers that differ with regard to their chemical composition, physical properties, or both; for example layers may differ with regard to one or more of foam density, polymer composition, specific surface area, or pore size (also referred to as cell size). For example, for a HIPE foam if the difference relates to pore size, the average pore size in each layer may differ by at least about 20%, in certain embodiments by at least about 35%, and in still other embodiments by at least about 50%. In another example, if the differences in the layers of a HIPE foam relate to density, the densities of the layers may differ by at least about 20%, in certain embodiments by at least about 35%, and in still other embodiments by at least about 50%. For instance, if one layer of a HIPE foam has a density of 0.020 g/cc, another layer may have a density of at least about 0.024 g/cc or less than about 0.016 g/cc, in certain embodiments at least about 0.027 g/cc or less than about 0.013 g/cc, and in still other embodiments at least about 0.030 g/cc or less than about 0.010 g/cc. If the differences between the layers are related to the chemical composition of the HIPE or HIPE foam, the differences may reflect a relative amount difference in at least one monomer component, for example by at least about 20%, in certain embodiments by at least about 35%, and in still further embodiments by at least about 50%. For instance, if one layer of a HIPE or HIPE foam is composed of about 10% styrene in its formulation, another layer of the HIPE or HIPE foam should be composed of at least about 12%, and in certain embodiments of at least about 15%.

A HIPE foam having separate layers formed from differing HIPEs, as explained in more detail below, provides a HIPE foam with a range of desired performance characteristics. For example, a HIPE foam having a first and second foam layer, wherein the first foam layer has a relatively larger pore or cell size, than the second layer, when used in an absorbent article may more quickly absorb incoming fluids than the second layer. By way of example when used in an absorbent articled the first foam layer may be layered over the second foam layer having relatively smaller pore sizes, as compared to the first foam layer, which exert more capillary pressure and drain the acquired fluid from the first foam layer, restoring the first foam layer's ability to acquire more fluid. HIPE foam pore sizes may range in average diameter of from 1 to 200 µm and in certain embodiments may be less than 100 µm. HIPE foams produced from the present invention having two major parallel surfaces may be from 0.05 to 10 mm thick, and in certain embodiments 8 mm or less. The desired thickness of a HIPE will depend on the materials used to form the HIPE, the speed at which a HIPE is extruded on a belt, and the intended use of the resulting HIPE foam.

The HIPE foams produced from the present invention are relatively open-celled. This refers to the individual cells or pores of the HIPE foam being in substantially unobstructed communication with adjoining cells. The cells in such substantially open-celled HIPE foam structures have intercellular openings or windows that are large enough to permit ready fluid transfer from one cell to another within the HIPE foam structure. For purpose of the present invention, a HIPE foam is considered "open-celled" if at least about 80% of the cells in the HIPE foam that are at least 1 µm in average diameter size are in fluid communication with at least one adjoining cell.

In addition to being open-celled, in certain embodiments HIPE foams are sufficiently hydrophilic to permit the HIPE foam to absorb aqueous fluids, for example the internal surfaces of a HIPE foam may be rendered hydrophilic by residual hydrophilizing surfactants or salts left in the HIPE foam following polymerization, by selected post-polymerization HIPE foam treatment procedures (as described hereafter), or combinations of both.

In certain embodiments, for example when used in certain absorbent articles, a HIPE foam may be flexible and exhibit an appropriate glass transition temperature (Tg). The Tg represents the midpoint of the transition between the glassy and rubbery states of the polymer. In general, HIPE foams that have a higher Tg than the temperature of use can be very strong but will also be rigid and potentially prone to fracture. In certain embodiments, regions of the HIPE foams of the current invention which exhibit either a relatively high Tg or excessive brittleness will be discontinuous. Since these discontinuous regions will also generally exhibit high strength, they can be prepared at lower densities without compromising the overall strength of the HIPE foam.

HIPE foams intended for applications requiring flexibility should contain at least one continuous region having a Tg as low as possible, so long as the overall HIPE foam has acceptable strength at in-use temperatures. In certain embodiments, the Tg of this region will be less than about 30° C. for foams used at about ambient temperature conditions, in certain other embodiments less than about 20° C. For HIPE foams used in applications wherein the use temperature is higher or lower than ambient, the Tg of the continuous region may be no more that 10° C. greater than the use temperature, in certain embodiments the same as use temperature, and in further embodiments about 10° C. less than use temperature wherein flexibility is desired. Accordingly, monomers are selected as much as possible that provide corresponding polymers having lower Tg's.

The HIPE foams produced from the present invention may be used as absorbent core materials in absorbent articles, such as feminine hygiene articles, for example pads, pantiliners, and tampons; disposable diapers; incontinence articles, for example pads, adult diapers; homecare articles, for example wipes, pads, towels; and beauty care articles, for example pads, wipes, and skin care articles, such as used for pore cleaning.

To produce a HIPE using the above, an aqueous phase and an oil phase are combined in a ratio between about 8:1 and 140:1. In certain embodiments, the aqueous phase to oil phase ratio is between about 10:1 and about 75:1, and in certain other embodiments the aqueous phase to oil phase ratio is between about 13:1 and about 65:1. This is termed the "water-to-oil" or W:O ratio and can be used to determine the density of the resulting HIPE foam. As discussed, the oil phase may contain one or more of monomers, comonomers, photoinitiators, crosslinkers, and emulsifiers, as well as optional components. The water phase will contain water and in certain embodiments one or more components such as electrolyte, initiator, or optional components.

The HIPE can be formed from the combined aqueous and oil phases by subjecting these combined phases to shear agitation in a mixing chamber or mixing zone. The combined aqueous and oil phases are subjected to shear agitation to produce a stable HIPE having aqueous droplets of the desired size. An initiator may be present in the aqueous phase, or an initiator may be introduced during the HIPE making process, and in certain embodiments, after the HIPE has been formed but before the HIPE has been extruded on a belt. The emulsion making process produces a HIPE where the aqueous phase droplets are dispersed to such an extent that the resulting HIPE foam will have the desired structural characteristics. Emulsification of the aqueous and oil phase combination in the mixing zone may involve the use of a mixing or agitation device such as an impeller, by passing the combined aqueous and oil phases through a series of static mixers at a rate necessary to impart the requisite shear, or combinations of both. Once formed, the HIPE can then be withdrawn or pumped from the mixing zone. One method for forming HIPEs using a continuous process is described in U.S. Pat. No. 5,149,720 (DesMarais et al), issued Sep. 22, 1992; U.S. Pat. No. 5,827,909 (DesMarais) issued Oct. 27, 1998; and U.S. Pat. No. 6,369,121 (Catalfamo et al.) issued Apr. 9, 2002.

Figure 1:
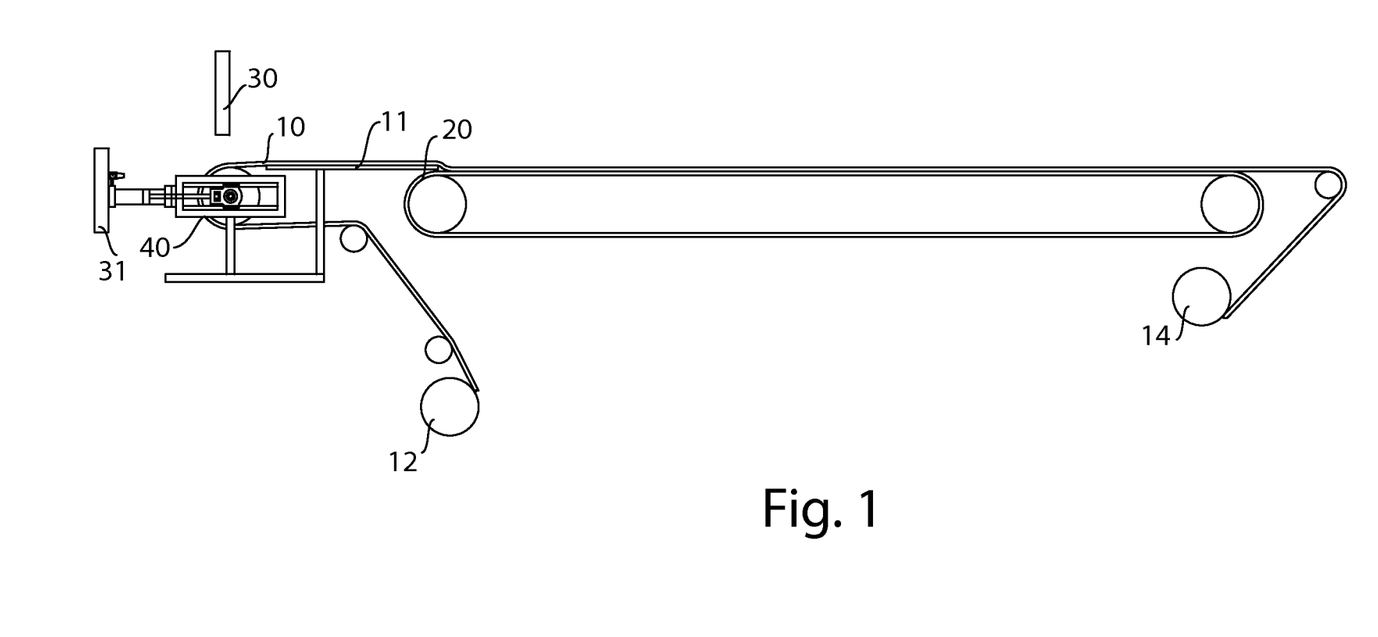
FIG. 1 is a schematic side view of an extrusion process.

In certain embodiments, as shown in FIG. 1, for a continuous process a HIPE can be withdrawn or pumped from the mixing zone and extruded on to a carrier sheet 10 disposed on a belt, such as an endless belt 20 travelling in a substantially horizontal direction. The HIPE may also be extruded on to the belt 20 directly. The HIPE may be extruded through one or more extruding devices such as a die 30 (as shown in FIG. 1), sprayer, or caster. In certain embodiments, a HIPE is extruded in a substantially even thickness across the width of the carrier sheet 10 to form a sheet-like material. The average thickness of a HIPE, as measured from the surface of the HIPE that is in contact with the belt to the opposing HIPE surface, can be adjusted by the movement speed of the belt, the flow of HIPE extruded on the belt, or the configuration of one or more extruding devices used to extrude the HIPE on a belt.

Examples of belts may include endless belts made of one or more metals, a resin, or combinations thereof; or sheet materials such as films that may be positioned on the belt and moving therewith. The average thickness of the HIPE, as measured from the surface of the HIPE that is in contact with the belt to the opposing HIPE surface, can be adjusted by the movement speed of the belt, the flow of HIPE deposited on the belt, or the configuration of one or more depositing devices used to deposit the HIPE on a belt.

The belt can be any thickness or shape suitable for producing a HIPE foam. The belt has a cross directional width. Further, the surface of the belt upon which the HIPE will be deposited, can be substantially smooth or may contain depressions, protuberances, or combinations thereof. The protuberances or depressions may be arranged in any formation or order and can be used to provide patterns, designs, markings or the like to HIPE foam. The belt may contain one or more materials suitable for the polymerization conditions (various properties such as heat resistance, weatherability, surface energy, abrasion resistance, recycling property, tensile strength and other mechanical strengths) and may contain at least one material from the group including films, non-woven materials, woven materials, and combinations thereof. Examples of films include, fluorine resins such as polytetrafluoroethylene, tetrafluoroethylene-perfluoroalkylvinyl ether copolymers, tetrafluoroethylene-hexafluoropropylene copolymers, and tetrafluoroethylene-ethylene copolymers; silicone resins such as dimethyl polysiloxane and dimethylsiloxane-diphenyl siloxane copolymers; heat-resistant resins such as polyimides, polyphenylene sulfides, polysulfones, polyether sulfones, polyether imides, polyether ether ketones, and para type aramid resins; thermoplastic polyester resins such as polyethylene terephthalates, polybutylene terephthalates, polyethylene naphthalates, polybutylene naphthalates, and polycyclohexane terephthalates, thermoplastic polyester type elastomer resins such as block copolymers (polyether type) formed of PBT and polytetramethylene oxide glycol and block copolymers (polyester type) formed of PBT and polycaprolactone may be used. These materials may be used either singly or in mixed form of two or more materials. Further, the belt may be a laminate having two or more different materials or two or more materials of the same composition, but which differ in one or more physical characteristics, such as quality or thickness. In certain embodiments the belt or a film positioned on the belt and moving therewith may be transparent to UV light; allowing the UV light from a UV light source positioned below the belt, film or both to polymerize the monomers in a HIPE foam.

In one embodiment of the present invention, as shown in FIG. 1 the extruding device is a die 30 mounted on a die stand 31. The die 30 extrudes a HIPE on to a carrier sheet 10 which is supported by a support plate 11 and the underlying belt 20.

Further, maintenance of the die to carrier sheet surface gap, which is useful for uniform HIPE deposition, is much easier to maintain with the equipment of this invention, as the retractable piston assembly and drive assemblies are much lighter than either the die and associated mixing equipment or the belt pulley assembly, and can be positioned against a mechanical stop, for example as a way of reproducibly returning the carrier sheet to the proper position with respect to the die. A further advantage lies in the measurement of the above mentioned gap. If the heating zone is, for example a steam oven heated with steam, measuring the gap with gauges is not easily or safely done when the steam oven is at full temperature, but that is when the measurement should be made, as the steam oven will change dimensions significantly between the room temperature state and the target polymerization temperature. Also, attempting to control the gap by adjusting the position of the belt pulley interferes with the need to keep the belt tracked.

In certain embodiments, a carrier sheet moves the HIPE into a heating zone where the monomers present in the HIPE are polymerized. Without being bound by theory, it is believed that HIPE foam formation has two overlapping processes. These are the polymerization of the monomers and the formation of crosslinks between active sites on adjacent polymer backbones. As used herein the term "polymerize" as in to polymerize monomers to form a HIPE foam encompass both polymerization of monomers and formation of crosslinks between active sites on adjacent polymer backbones. Crosslinking provides HIPE foams with strength and integrity that is helpful to their further handling and use. The current invention involves increasing the overall level of polymerization and cross-linking, thereby reducing the amount of unpolymerized monomer in the HIPE foam. Polymerization can be initiated prior to reaching the heating zone by, for example, preparing the HIPE at a temperature sufficient to begin polymerization. However, the HIPE is polymerized beyond the point of shapability or moldability in the heating zone. Heat for the heating zone can be, for example, derived from an oven located above and below the HIPE or surrounding the HIPE. Heat can be from forced air ovens, IR heat lamps, microwave, steam or other suitable source. As an example of using steam the heat zone may be a steam oven wherein the HIPE is exposed to steam, thereby achieving highly efficient thermal transfer as water condenses onto the HIPE.

In certain embodiments, the temperature may be elevated in a step-wise manner so as to increase the rate of polymerization, initiate drying, or both as the HIPE becomes more completely polymerized. In addition, the curing of the HIPE may be accomplished by passing the web through a hot liquid bath composed of any hot liquid of sufficient temperature to initiate the curing of the monomers. Polymerization temperatures will vary depending on the type of emulsion being cured, the initiator being used, heat source used, and whether or not the heating zone is sealed, but will typically be above 25° C., often above 50° C. In certain embodiments, polymerization temperatures within the heating zone may reach between about 50° C. and 150° C. The HIPE is maintained in the heating zone for a time sufficient to polymerize at least 75%, preferably at least 90% of the monomers in the oil phase of the HIPE. Sufficient polymerization of the HIPE may be controlled by a combination of the initiator used, the temperature of the heat zone, the efficiency of the heat transfer in the heat zone, the rate at which the HIPE goes through the heat zone and the length of the heat zone.

The monomers present in the HIPE are substantially polymerized in the heating zone. In certain embodiments, in place of or in addition to a heating zone, Ultraviolet (UV) light may be used to polymerize the monomers of a HIPE. For example, a HIPE may be pre-polymerized using UV light before entering a curing oven, or a HIPE foam could be exposed to UV light upon exiting a curing oven to reduce the level of unreacted monomers, or the UV light could be used in place of a curing oven to polymerize the monomers of a HIPE. There may be one or more sources of UV light used to polymerize the HIPE monomers. The sources may be the same or differ. For example, the sources may differ in the wavelength of the UV light they produce or in the amount of time a HIPE is exposed to the UV light source. The UV light wavelength in the range from about 200 to about 400 nm, and in certain embodiments from about 200 nm to 350 nm, overlaps to at least some degree with the UV light absorption band of the photoinitiator and is of sufficient intensity and exposure duration to polymerize monomers in a HIPE.

Following polymerization, the resulting HIPE foam is saturated with aqueous phase that needs to be removed to obtain a substantially dry HIPE foam. In certain embodiments, HIPE foams can be squeezed free of most of the aqueous phase by using compression, for example by running the HIPE foam through one or more pairs of nip rollers. The nip rollers can be positioned such that they squeeze the aqueous phase out of the HIPE foam. The nip rollers can be porous and have a vacuum applied from the inside such that they assist in drawing aqueous phase out of the HIPE foam. In certain embodiments, nip rollers can be positioned in pairs, such that a first nip roller is located above a liquid permeable belt, such as a belt having pores or composed of a mesh-like material and a second opposing nip roller acing the first nip roller and located below the liquid permeable belt. One of the pair, for example the first nip roller can be pressurized while the other, for example the second nip roller, can be evacuated, so as to both blow and draw the aqueous phase out the of the HIPE foam. The nip rollers may also be heated to assist in removing the aqueous phase. In certain embodiments, nip rollers are only applied to non-rigid HIPE foams, that is HIPE foams whose walls would not be destroyed by compressing the HIPE foam. In yet a further embodiment, the surface of the nip rollers may contain irregularities in the form of protuberances, depressions, or both such that a HIPE foam can be embossed as it is moving through the nip rollers. When the HIPE has the desired dryness it may be cut or sliced into a form suitable for the intended application.

In certain embodiments, in place of or in combination with nip rollers, the aqueous phase may be removed by sending the HIPE foam through a drying zone where it is heated, exposed to a vacuum, or a combination of heat and vacuum exposure. Heat can be applied, for example, by running the foam though a forced air oven, IR oven, microwave oven or radiowave oven. The extent to which a HIPE foam is dried depends on the application. In certain embodiments, greater than 50% of the aqueous phase is removed. In certain other embodiments greater than 90%, and in still other embodiments greater than 95% of the aqueous phase is removed during the drying process.

Figure 2:
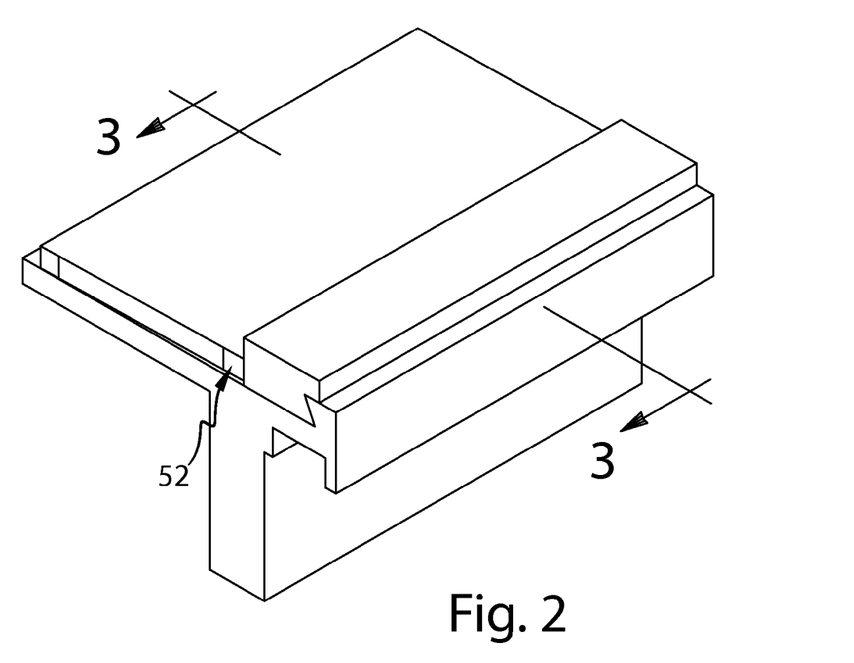
FIG. 2 is a schematic side view of an embodiment of the present invention.
Figure 3:
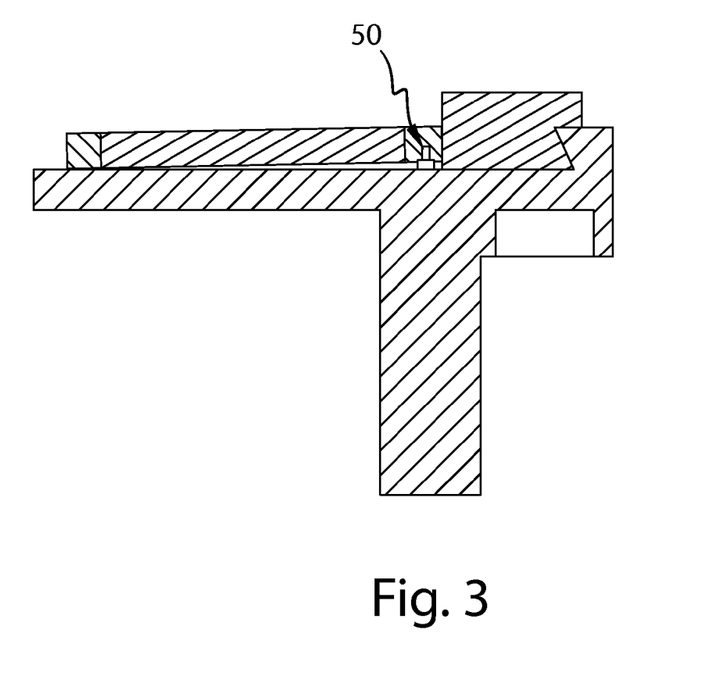
FIG. 3 is a cross section schematic view of an embodiment of the present invention taken along 3-3.

In certain embodiments, as shown in FIG. 2 and FIG. 3, one or more nip inserts 50 may be located under the vacuum box 52. A nip insert 50 may be one or more layers of tape, a bolt, a washer, a screw, a piece of wood, and/or any other known item capable of propping an isolated point. The nip inserts 50 may be placed at intervals along the cross direction of the belt at a distance of about 0.5 inches to 5 inches. The nip inserts 50 may be placed at intervals along the cross direction of the belt at a distance of about 0.5 inch, 1 inch, 1.5 inches, 2 inches, 2.5 inches, 3 inches, 3.5 inches, 4 inches, and/or 5 inches apart. The nip insert 50 may raise the vacuum in contact with the belt by about 0.01 inch to 0.25 inch. The nip inserts 50 may be adjustable to raise the vacuum box 52 in contact with the belt between about 0.01 inch to about 0.25 inch. The nip insert 50 may raise the vacuum box 52 in contact with the belt by about 0.01 inch, 0.02 inch, 0.03 inch, 0.04 inch, 0.05 inch, 0.06 inch, 0.07 inch, 0.08 inch, 0.09 inch, 0.1 inch, 0.15 inch, 0.2 inch, or 0.25 inch at the point directly above the nip insert 50.

Without being bound to any theory, it is believed that raising the vacuum box leads to improved removal of the saturated aqueous phase at the specific points along the cross direction of the belt where the vacuum box is raised. To create a uniform moisture and salt profile, it is believed that placing nip inserts at set interval distances along the cross direction of the belt leads to an increased efficiency in the removal of the saturated aqueous phase while creating a more uniform final moisture and salt profile after vacuum. This can best be appreciated while increasing the length of the belt in the cross direction leading to a need for larger or multiple vacuum systems while still maintaining a need to create a HIPE that exhibits a uniform moisture and salt profile.

The effect of the nip inserts can be seen when comparing the 4 mL gush acquisition and caliper data of the final material with and without nip inserts as shown in Table 1. A belt is divided into lanes along the cross direction of the belt. Nip inserts are placed under individual lanes along the belt cross direction to determine the localized effect on moisture profiles. Using the nip inserts, one sees a decrease in Gush acquisition time for 4 mL of test fluid and an increase in dry caliper measurement.

TABLE 1

| Lane/Height of Nip Insert | Gush Absorption (sec) | | Dry Caliper mm | |
|---|---|---|---|---|
| | Without a Nip Insert | With a Nip Insert | Without a Nip Insert | With a Nip Insert |
| Test 1: Lane 3 at 0.05 inch | 85.8 | 70.6 | 2.23 | 2.51 |
| Test 2: Lane 6 at 0.04 inch | 81.5 | 64.4 | 2.16 | 2.36 |
| Test 3: Lane 3 at 0.05 inch | 86.1 | 71.4 | 1.98 | 2.21 |
| Test 3: Lane 4 at 0.05 inch | 86.0 | 75.6 | 1.99 | 2.07 |

One of ordinary skill in the art would appreciate that the use of nip inserts to improve dewatering thereby creating a uniform moisture profile may be used in any dewatering process beyond HIPEs. Other dewatering processes may include regular foams, paper production, or any pulp based process utilizing belts and a vacuum to draw the aqueous phase from a composition.

Test Method Section:
HIPE 4 mL Gush Acquisition Time Test
Purpose

This Test Method was developed to measure the time required for a known volume of fluid to pass through the upper layer and into the lower "storage" layer of Composite HIPE. The test fluid used in this test has viscous characteristics similar to menstrual fluid.

The test is run on raw material samples under the following conditions:
  Fluid load: 4 mL
  Confining pressure: 1.72 kPa (0.25 psi)
Equipment
Pipette, capable of delivering 4.0+/−0.05 mL of fluid solution, from a convenient source.
Urethane foam pad, 0.04 g/cm$^2$ at 1.25 cm thickness, from a convenient source.
Filter paper, grade no. 54, from a convenient source.
Buchner funnel and vacuum flask, from a convenient source.
Stopwatch, NIST traceable, with resolution the nearest 0.01 sec., from a convenient source.
Viscometer/rheometer, capable of measuring viscosity in the 5-10 cP range with a resolution to the nearest 0.01 cP.
Gush plate, 10.2 cm×10.2 cm.
Confining weight plates, 10.2×10.2 cm with 2.54 cm diameter hole in center (to deliver 1.72 kPa confining pressure when combined with Gush plate).
Top-loading analytical balance, with resolution to the nearest 0.01 g, from a convenient source.
Test Procedure
1. Place the HIPE Composite specimen large cell-side up on top of the foam pad.
2. Place the Gush Plate on top of the HIPE specimen so the edges of the Gush Plate are aligned with the edges of the foam pad.
3. Place the Weight Plate on top of the Gush Plate so the edges of the Weight Plate are aligned with the edges of the Gush Plate and foam pad. NOTE: The combined weight of the Gush Plate and Weight Plate shall be 1815+/−1 g to deliver the 1.72 kPa confining pressure.
4. Using the pipette, deliver 4.0 mL of test fluid solution to the inner wall of the Gush plate, immediately above the portion of the HIPE large cell surface visible through the holes in the center of the Weight and Gush plates.

5. Immediately start the timer.
6. Observe the progress of the acquisition of CMC fluid into the HIPE specimen, and stop the timer when the last bit of test fluid disappears below the surface of the HIPE.
7. Rinse any residual test fluid solution from the Gush Plate with water and thoroughly dry the plate before testing any additional specimens.

Reporting

Report the time in seconds (to the nearest 0.1 sec) for the test fluid to be acquired by the HIPE.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for producing a High Internal Phase Emulsion foam, the method comprising:
    forming a High Internal Phase Emulsion from an oil phase comprising a monomer, a cross-linking agent, an emulsifier, and an aqueous phase;
    providing an extrusion device,
    providing a belt comprising a cross directional width;
    providing a vacuum box, wherein the vacuum box comprises a nip insert, wherein the nip insert is located below the vacuum box and is in direct contact with the vacuum box;
    extruding the High Internal Phase Emulsion on the belt;
    polymerizing the monomer in the oil phase of the High Internal Phase Emulsion; and
    passing the High Internal Phase Emulsion over the vacuum box to remove a saturated aqueous phase.

2. The method of claim 1, wherein the vacuum box comprises a plurality of nip inserts, wherein each of the plurality of nip inserts impacts an individual vacuum box.

3. The method of claim 1 wherein the nip insert is selected from the group consisting of one or more layers of tape, a bolt, a washer, a screw, a piece of wood, and/or combinations thereof.

4. The method of claim 2, wherein the nip inserts are located at intervals along the belt cross directional width, wherein the intervals between nip inserts are between about 0.5 inch to about 5 inches.

5. The method of claim 2, wherein the nip inserts are located at intervals along the belt cross directional width, wherein the intervals between nip inserts are between about 1 inch to about 3 inches.

6. The method of claim 2, wherein the nip inserts raise the vacuum box by about 0.01 inch to about 0.1 inch.

7. The method of claim 2, wherein the nip inserts raise the vacuum box by about 0.02 inch to about 0.05 inch.

8. A method for producing a High Internal Phase Emulsion foam, the method comprising:
    forming a first High Internal Phase Emulsion from a first oil phase comprising a first monomer, a first cross-linking agent, a first emulsifier, and a first aqueous phase;
    forming a second High Internal Phase Emulsion from a second oil phase comprising a second monomer, a second cross-linking agent, a second emulsifier, and a second aqueous phase;
    providing an extrusion device,
    providing a belt comprising a cross directional width;
    providing a vacuum box, wherein the vacuum box comprises a nip insert, wherein the nip insert is located below the vacuum box and is in direct contact with the vacuum box;
    extruding the first High Internal Phase Emulsion on the belt;
    extruding the second High Internal Phase Emulsion on the first High Internal Phase Emulsion;
    polymerizing the monomer in the oil phase of the first High Internal Phase Emulsion and the second High Internal Phase Emulsion; and
    passing the High Internal Phase Emulsion over the vacuum box to remove a saturated aqueous phase.

9. The method of claim 8, wherein the vacuum box comprises a plurality of nip inserts.

10. The method of claim 8, wherein the nip insert is selected from the group consisting of one or more layers of tape, a bolt, a washer, a screw, a piece of wood, and/or combinations thereof.

11. The method of claim 9, wherein the nip inserts are located at intervals along the belt cross directional width, wherein the intervals between nip inserts are between about 0.5 inch to about 5 inches.

12. The method of claim 9, wherein the nip inserts are located at intervals along the belt cross directional width, wherein the intervals between nip inserts are between about 1 inch to about 3 inches.

13. The method of claim 9, wherein the nip inserts raise the vacuum box by about 0.01 inch to about 0.1 inch.

14. The method of claim 9, wherein the nip inserts raise the vacuum box by about 0.02 inch to about 0.05 inch.

* * * * *